(12) United States Patent
Li et al.

(10) Patent No.: US 8,430,000 B2
(45) Date of Patent: Apr. 30, 2013

(54) CAM INDEXER

(75) Inventors: Bing Li, Shenzhen (CN); Bo Yang, Shenzhen (CN); Yong Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/425,391

(22) Filed: Mar. 20, 2012

(65) Prior Publication Data

US 2013/0061717 A1 Mar. 14, 2013

(30) Foreign Application Priority Data

Sep. 8, 2011 (CN) .......................... 2011 1 0265582

(51) Int. Cl.
- *F16H 53/06* (2006.01)
- *B23B 29/24* (2006.01)
- *B23Q 16/00* (2006.01)
- *B23Q 16/02* (2006.01)
- *B23Q 3/18* (2006.01)

(52) U.S. Cl.
USPC ............ 74/569; 74/813 L; 74/813 R; 74/816; 269/903; 269/63

(58) Field of Classification Search .................. 74/813 L, 74/813 R, 553, 820, 816, 815, 567, 569, 10.29–10.37, 74/10.22, 527, 118, 125, 55, 568 R, 526; 269/58, 903, 21, 55, 60, 63, 231, 236

See application file for complete search history.

(56) References Cited

U.S. PATENT DOCUMENTS

| | | | | |
|---|---|---|---|---|
| 2,021,030 A * | 11/1935 | Swahnberg | ..................... | 74/820 |
| 2,225,426 A * | 12/1940 | Aronson | ......................... | 269/59 |
| 2,356,097 A * | 8/1944 | Stanley | ........................ | 409/222 |
| 2,618,982 A * | 11/1952 | Mead | .............................. | 74/128 |
| 2,887,905 A * | 5/1959 | Reynolds | ....................... | 74/821 |
| 2,890,590 A * | 6/1959 | O'Harah | ........................... | 74/88 |
| 2,956,452 A * | 10/1960 | Dever | ............................ | 74/822 |
| 2,995,958 A * | 8/1961 | Jungeling et al. | ........... | 74/813 R |
| 3,348,431 A * | 10/1967 | Postolowski | ................... | 74/822 |
| 3,471,227 A * | 10/1969 | Thomson et al. | ............. | 352/169 |
| 3,648,530 A * | 3/1972 | Eckerdt | ........................... | 74/128 |
| 3,653,268 A * | 4/1972 | Diepeveen | ........................ | 74/55 |
| 3,664,203 A * | 5/1972 | Pataki | ............................... | 74/55 |
| 3,739,660 A * | 6/1973 | Schubert | ........................ | 74/815 |
| 3,803,949 A * | 4/1974 | Rokosky et al. | ................ | 74/815 |
| 3,829,076 A * | 8/1974 | Sofy | ............................... | 269/57 |
| 3,846,597 A * | 11/1974 | Ziegler, Jr. | ............... | 200/38 BA |

(Continued)

*Primary Examiner* — Thomas R Hannon
*Assistant Examiner* — Kashif Mohammed
(74) *Attorney, Agent, or Firm* — Altis Law Group, Inc.

(57) ABSTRACT

A cam indexer includes a driving assembly, a driving plate, a multi-task dial, a latching assembly and a positioning assembly. The driving plate defines an arc-groove at the periphery thereof and a cam surface at the bottom of the arc-groove, the driving plate further includes a receiving end and a resisting end positioned at opposite ends of the cam surface. The multi-task dial defines four positioning grooves along the periphery thereof; the latching assembly is fixed to the driving plate and elastically engages in first one positioning groove, the positioning assembly elastically engages in a second one positioning groove. The latching assembly and the positioning assembly are adapted to detach from the positioning grooves when the driving plate is driven by the driving assembly, such that the cam indexer functions as a partitioning mechanism.

20 Claims, 8 Drawing Sheets

U.S. PATENT DOCUMENTS

| | | | |
|---|---|---|---|
| 3,877,563 A * | 4/1975 | Hayashi | 198/418.6 |
| 3,987,688 A * | 10/1976 | Tarbet | 74/568 FS |
| 4,028,966 A * | 6/1977 | Taylor | 74/822 |
| 4,037,493 A * | 7/1977 | Freer | 74/820 |
| 4,512,214 A * | 4/1985 | Surman | 74/820 |
| 4,625,575 A * | 12/1986 | Le Bras | 74/63 |
| 4,646,100 A * | 2/1987 | England | 343/757 |
| 4,803,765 A * | 2/1989 | Ito | 29/48.5 R |
| 4,884,474 A * | 12/1989 | Kawata | 74/813 L |
| 4,899,998 A * | 2/1990 | Teramachi | 269/63 |
| 5,711,192 A * | 1/1998 | Vasilantone | 74/827 |
| 7,024,740 B2 * | 4/2006 | Kato | 29/43 |
| 2001/0022116 A1 * | 9/2001 | Kawata | 74/813 R |

* cited by examiner

CAM INDEXER

BACKGROUND

1. Technical Field

The present disclosure relates to a partitioning mechanism, and more particularly, to a cam indexer.

2. Description of Related Art

In materials auto-assembling or auto-loading process, in order to achieve multi-tasking in a cyclical operation, a cam indexer is generally employed to fetch workpieces for workstations. However, known structures and steering models of cam indexers are complicated and installing processes of the cam indexers may not be convenient.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
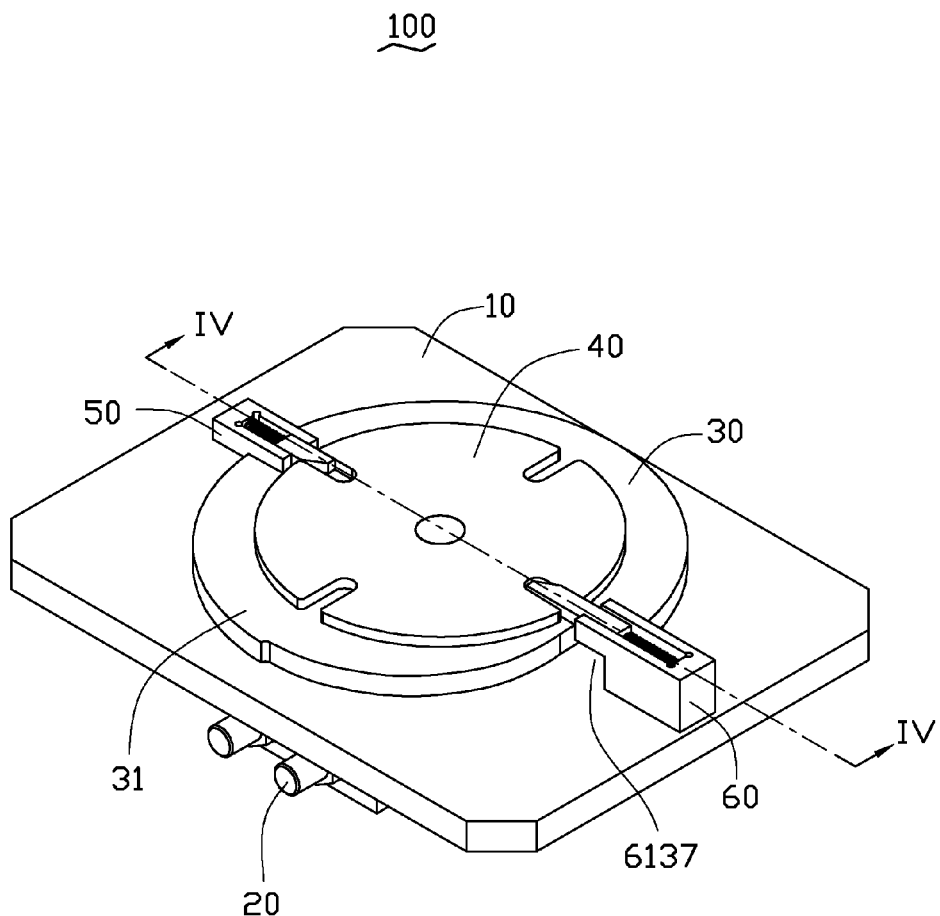
FIG. 1 is an isometric view of an embodiment of a cam indexer.
Figure 2:
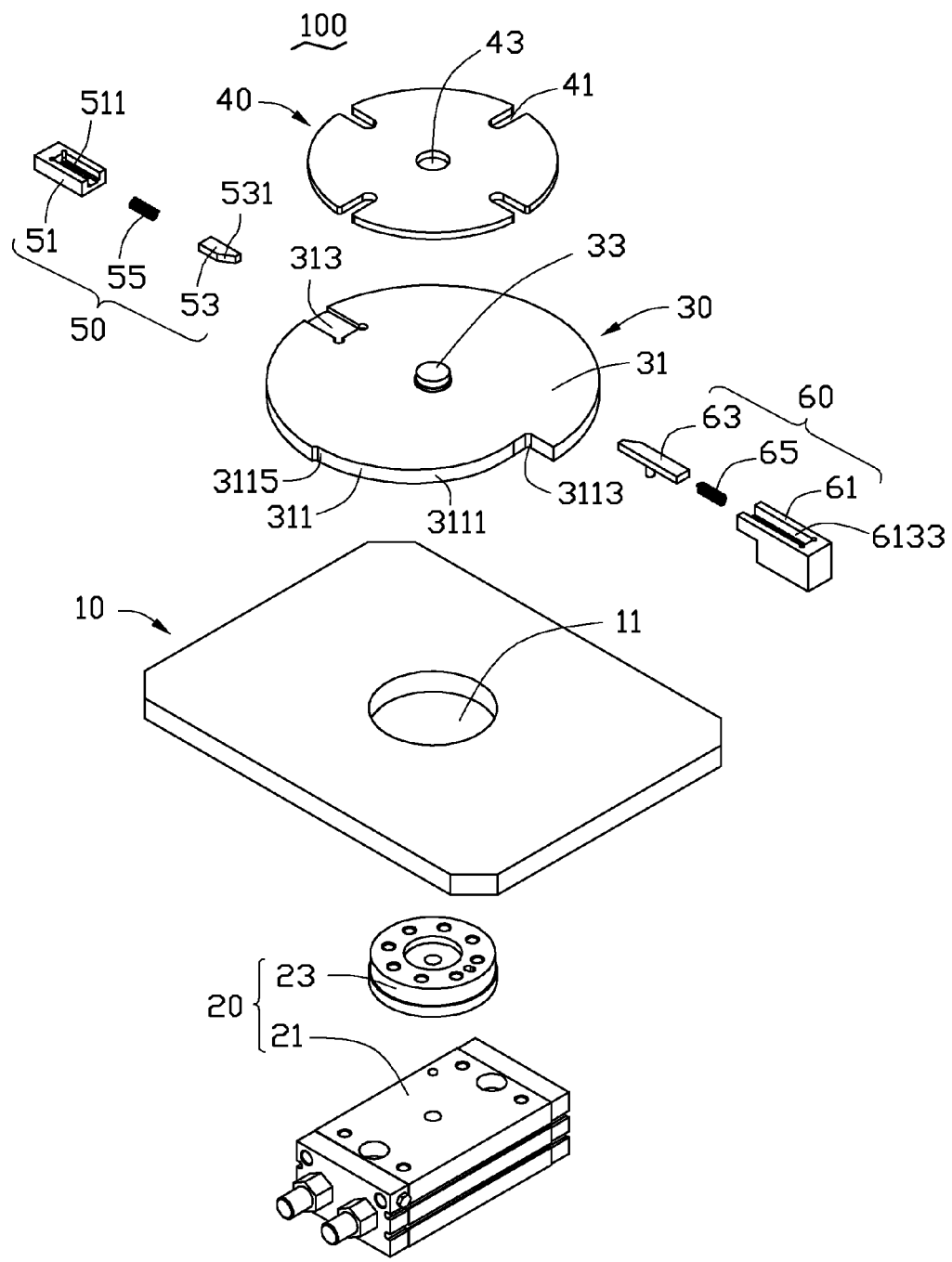
FIG. 2 is an exploded, isometric view of the cam indexer of FIG. 1.

Referring to FIGS. 1 and 2, an embodiment of a cam indexer 100 includes a bottom plate 10, a driving assembly 20, a driving plate 30, a multi-task dial 40, a latching assembly 50 and a positioning assembly 60. The driving plate 30 is rotatably mounted on the bottom plate 10 and is driven by the driving assembly 20. The multi-task dial 40 is rotatably mounted on the driving plate 30. The latching assembly 50 and the positioning assembly 60 are mounted adjacent to the periphery of the multi-task dial 40 and spaced from each other.

The bottom plate 10 is a substantially rectangular plate and defines a mounting hole II in the middle. In the embodiment, the mounting hole 11 is circular.

The driving assembly 20 includes a driver 21 and a driving shaft 23 connected to an end of the driver 21. The driver 21 is fixed to the bottom plate 10 and located below the mounting hole 11, the driving shaft 23 extends through the mounting hole 11 and an end of the driving shaft 23 protrudes above the bottom plate 10. In the embodiment, the driver 21 is a rotation cylinder.

The driving plate 30 is fixed to the driving shaft 23 and located above the bottom plate 10. The driving plate 30 is capable of being driven by the driver 21, and includes a main body 31 and a rotation shaft 33 perpendicularly extending from the center of the main body 31. The main body 31 is substantially a flat disc, and defines an arc-groove 311 at the periphery of the main body 31 and a cam surface 3111 at the bottom of the arc-groove 311. The main body 31 further includes a receiving end 3113 and a resisting end 3115 positioned at opposite ends of the cam surface 3111. The cam surface 3111 is smooth and faces radially out from the main body 31. A distance between the receiving end 3113 and the center of the main body 31 is different from a distance between the resisting end 3115 and the center of the main body 31. In the embodiment, the distance between the receiving end 3113 and the center of the main body 31 is less than the distance between the resisting end 3115 and the center of the main body 31. The main body 31 further defines a mounting groove 313 at an upper surface adjacent to an edge of the main body 31 corresponding to the latching assembly 50.

The multi-task dial 40 is substantially a flat disc and rotatably sleeved on the rotation shaft 33 of the driving plate 30. The diameter of the multi-task dial 40 is less than that of the driving plate 30. The multi-task dial 40 defines a plurality of positioning grooves 41 along the periphery and a pivotal hole 43 at the center of the multi-task dial 40. The pivotal hole 43 is circular, the multi-task dial 40 is sleeved on the rotation shaft 33 via the pivotal hole 43. Each of the plurality of positioning grooves 41 is a slot, open at the periphery of the multi-task dial 40 and extending inwards radially towards the pivotal hole 43. The plurality of positioning grooves 41 are arranged uniformly around the periphery of the multi-task dial 40. An angle subtended at the center of the multi-task dial 40 by every two adjacent ones of the plurality of positioning grooves 41 is equal to an angle subtended at the center of the driving plate 30 by the receiving end 3113 and the resisting end 3115. In the embodiment, the number of the plurality of positioning grooves 43 is four and the central angle subtended by every adjacent two of the plurality of positioning grooves 41 relative to the multi-task dial 40 is 90 degrees.

The latching assembly 50 is mounted in the mounting groove 313 of the driving plate 30 and adjacent to the multi-task dial 40. The latching assembly 50 is movably latched in one of the plurality of positioning grooves 41. The latching assembly 50 includes a latching housing 51, a latching member 53 and a resilient member 55. The latching housing 51 is in a strip shape and received in the mounting groove 313. The latching housing 51 defines a receiving groove 511 along the lengthways direction of the latching housing 51. The receiving groove 511 extends through an end surface of the latching housing 51 and communicates with the outside. The latching member 53 is a small bar of material and slidably received in the receiving groove 511 of the latching housing 51. The latching member 53 defines an inclined latching surface 531 at an end. The latching surface 531 is inclined toward outside, the latching surface 531 and the lengthways direction of the latching member 53 cooperatively define an acute angle. The resilient member 55 is received within the receiving groove 511 and located at an end of the latching member 53 opposite to the latching surface 531. The resilient member 55 is capable of urging the latching member 53 to slide out of the latching housing 51.

Figure 3:
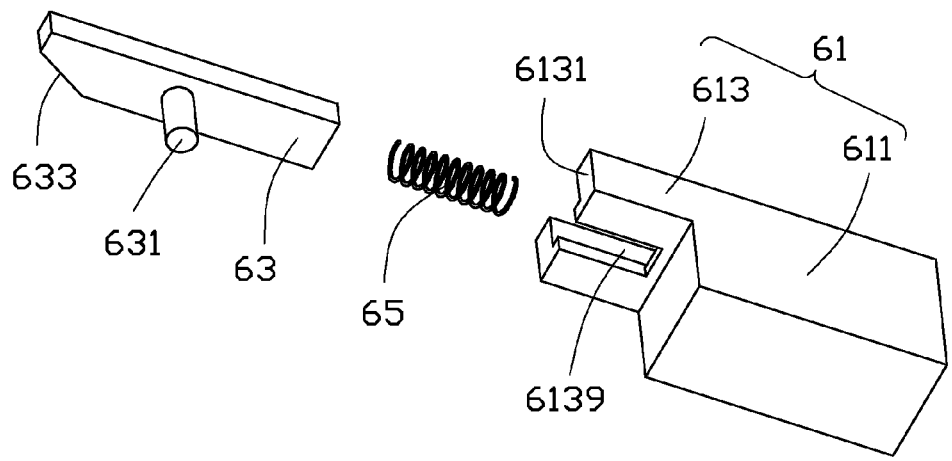
FIG. 3 is an exploded, isometric view of a positioning assembly of the cam indexer of FIG. 1.
Figure 4:
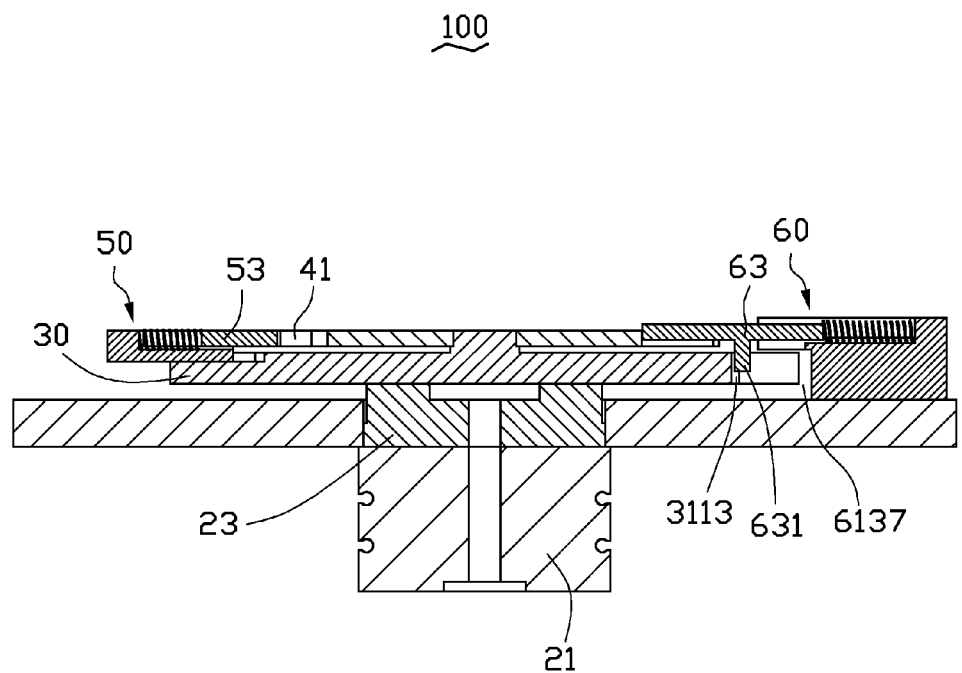
FIG. 4 is a cross-section of the cam indexer of FIG. 1 taken along line IV-IV.

Also referring to FIGS. 3 and 4, the positioning assembly 60 is mounted on the bottom plate 10 and adjacent to the multi-task dial 40. The positioning assembly 60 is positioned adjacent to the receiving end 3113 of the multi-task dial 40 and distanced from the latching assembly 50 by two of the plurality of positioning grooves 41. The positioning assembly 60 includes a positioning housing 61, a positioning member 63 and an elastic member 65. The positioning housing 61 includes a fixing portion 611 fixed to the bottom plate 10 and a guiding portion 613 fixed to the fixing portion 611. The guiding portion 613 includes an extending end 6131 extending from an end of the fixing portion 611 outwardly and defines a receiving groove 6133 on the guiding portion 613. The receiving groove 6133 extends through the extending end 6131 and cuts through an end surface of the extending end 6131. The extending end 6131 and the bottom plate 10 cooperatively define a moving space 6137. The guiding portion 613 further defines a through groove 6139 communicating with the moving space 6137 on the extending end 6131. The positioning member 63 is a small bar of material and includes a positioning portion 631 extending perpendicularly from a side thereof. The positioning member 63 further includes an end portion (not labeled) in a wedge shape and defines an inclined positioning surface 633 at the end portion. The positioning member 63 is received in the receiving groove 6133, the positioning portion 631 extends through the through groove 6139 and is partially received in the moving space 6137. The end portion of the positioning member 63 extends out of the positioning housing 61. The elastic member 65 is mounted in the receiving groove 6133 and connected to the positioning member 63. The elastic member 65 is capable of urging the positioning member 63 to slide out of the receiving groove 6133.

In assembly, the driver 21 is fixed to the bottom plate 10, the driving shaft 23 is fixed to the driver 21 and extends through the mounting hole 11 of the bottom plate 10. The driving plate 30 is mounted at a side of the bottom plate 10 opposite to the driver 21. The multi-task dial 40 is rotatably sleeved on rotation shaft 33 of the driving plate 30. The multi-task dial 40 is rotated to a predetermined position in which one of the plurality of positioning grooves 41 is aligned to the receiving end 3113 of the driving plate 30. The latching housing 51 is mounted in the mounting groove 313 with the receiving groove 511 facing the driving plate 30. The resilient member 55 is mounted in the receiving groove 511, and the latching member 53 is partially received in the receiving groove 511 with an end connected to the resilient member 55. An end of the latching member 53 is exposed outside the latching housing 51 and received in one of the plurality of positioning grooves 41.

The positioning housing 61 is fixed to the bottom plate 10 with the receiving groove 6133 facing the multi-task dial 40. The elastic member 65 is received in the receiving groove 6133, the positioning member 63 is partially received in the receiving groove 6133, the positioning portion 631 extends through the though groove 6139 and is partially received in the moving space 6137. An end of the positioning member 63 is connected to the elastic member 65, the end portion of the positioning member 63 extends into one of the plurality of positioning grooves 41 of the multi-task dial 40, the positioning portion 631 resists the receiving end 3113 of the driving plate 30. The positioning surface 633 of the positioning member 63 and the latching surface 531 of the latching member 53 are inclined back to back. Thus, the cam indexer 100 is assembled.

Figure 5:
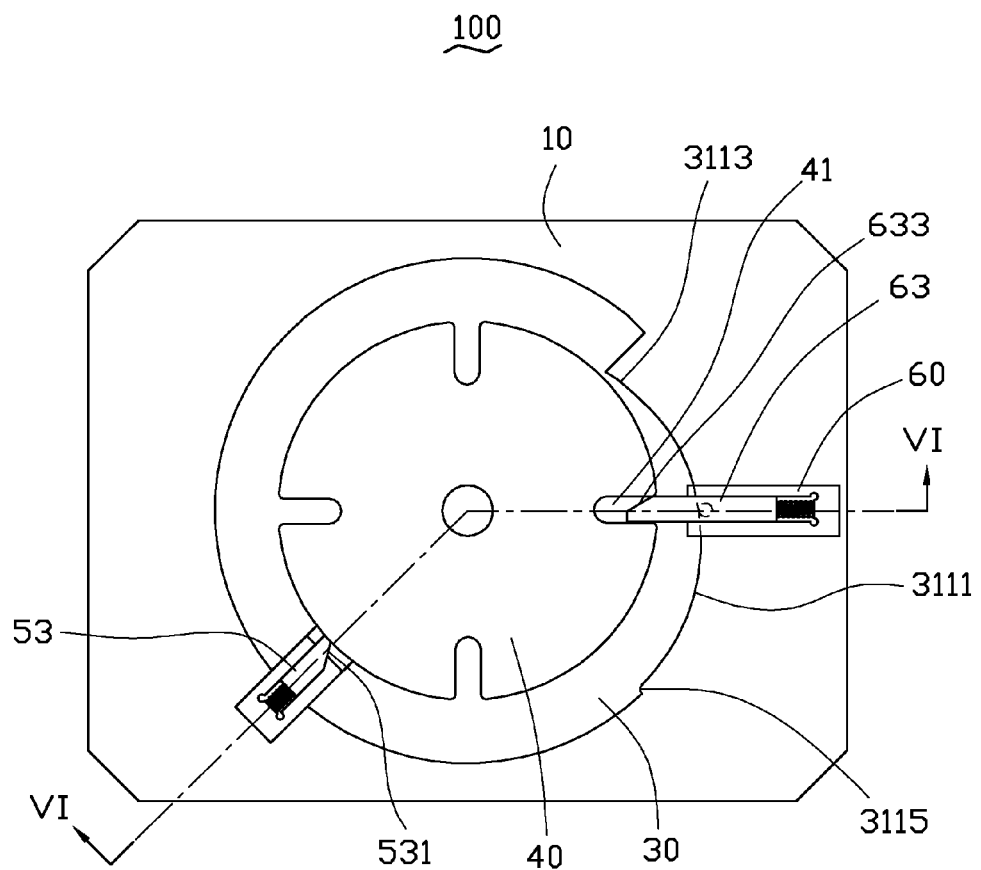
FIG. 5 is a top view of a moving state of a latching assembly of the cam indexer of FIG. 1.
Figure 6:
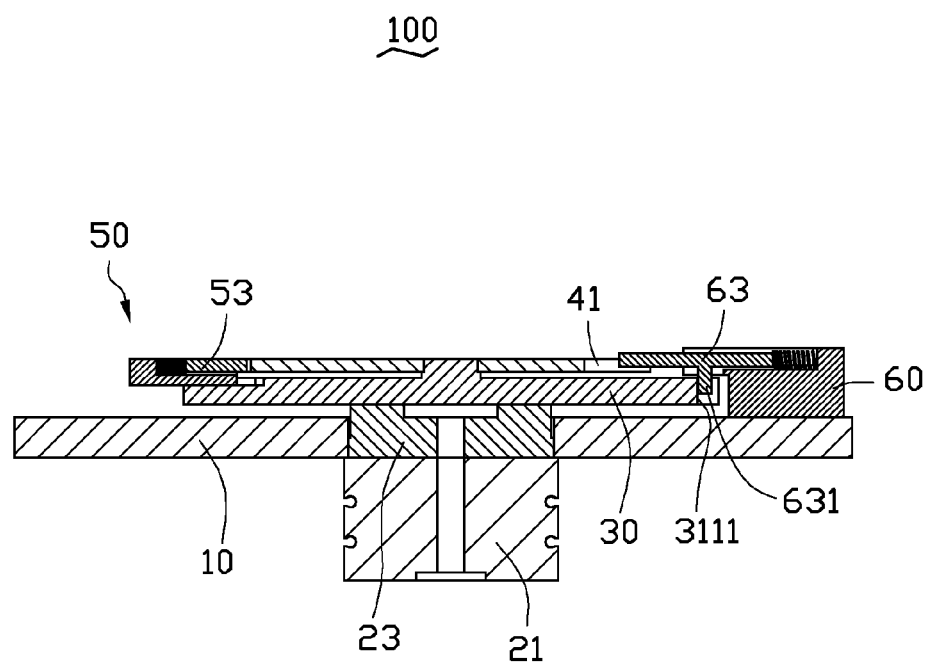
FIG. 6 is a cross-section of the cam indexer of FIG. 5 taken along line VI-VI.

Referring to FIGS. 4 through 6, when in use, the driving plate 30 is rotated by the driver 21, the resisting end 3115 of the driving plate 30 is rotated toward the positioning assembly 60 with the cam surface 3111 resisting on the positioning portion 631. The positioning portion 631 moves in the moving space 6137 and drives the positioning member 63 to slide out of one of the plurality of positioning grooves 41 of the multi-task dial 40. Meanwhile, the latching member 53 is driven by the driving plate 30 and the latching surface 531 of the latching member 53 resists on a side surface of one of the plurality of positioning grooves 41. The latching surface 531 ultimately retreats from one of the plurality of positioning grooves 41, and thus the latching assembly 50 is capable of rotating along the periphery of the multi-task dial 40 toward the positioning assembly 60.

Figure 7:
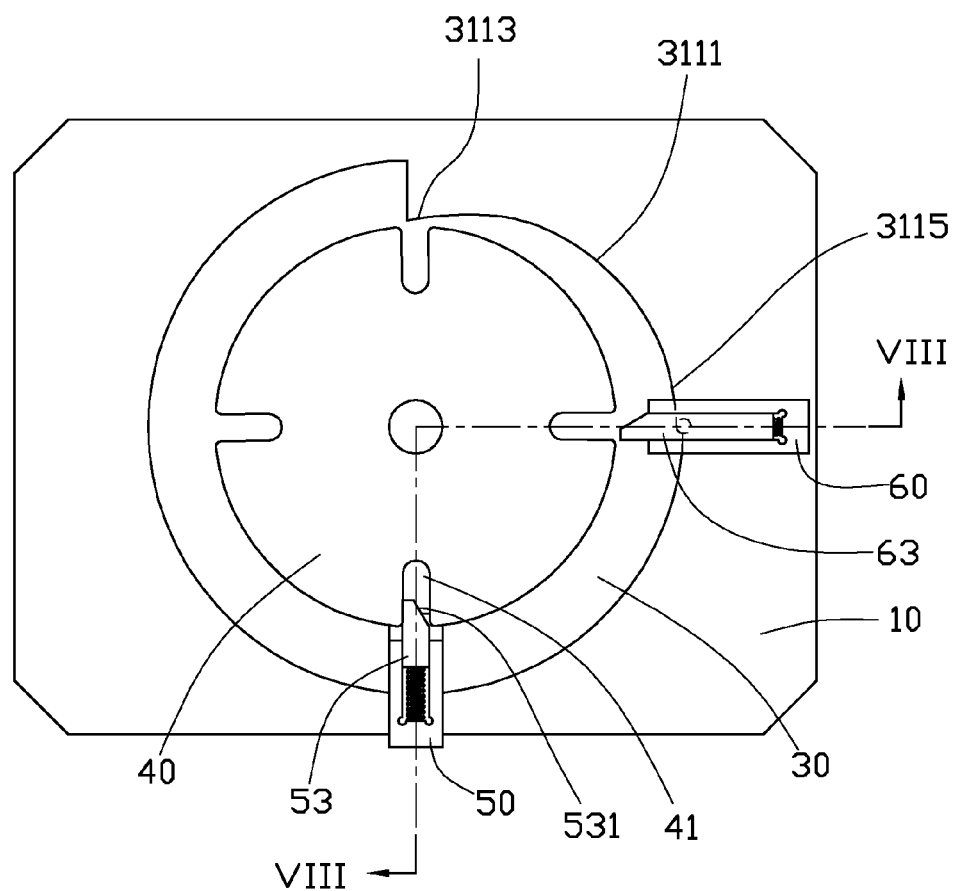
FIG. 7 is a top view of a positioning assembly detached from a positioning groove of the cam indexer of FIG. 1.
Figure 8:
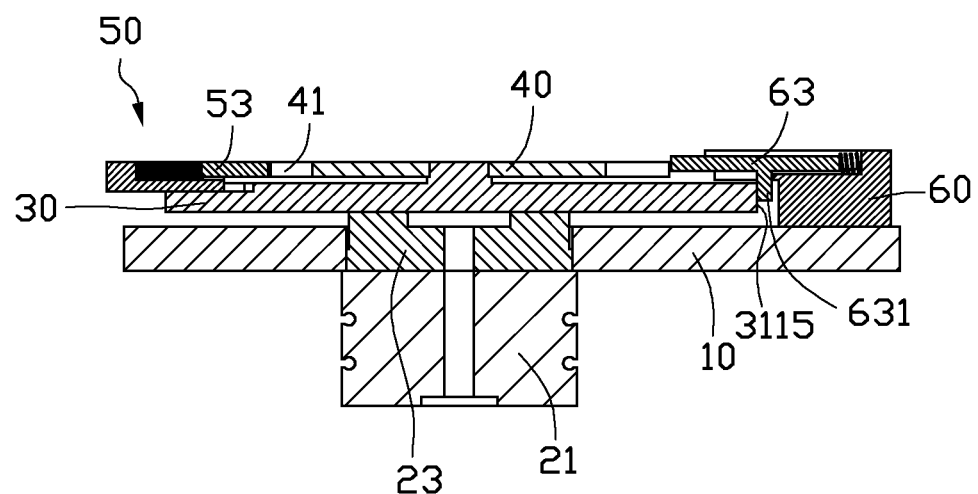
FIG. 8 is a cross-section of the cam indexer of FIG. 7 taken along line VIII-VIII.

Referring to FIGS. 7 and 8, when the latching assembly 50 reaches a next one of the plurality of positioning grooves 41, the latching member 53 is pushed by the resilient member 55 and engages into the next one of the plurality of positioning grooves 41. At the same time, the resisting end 3115 rotates to a predetermined position and pushes the positioning member 63 completely out of the next one of the plurality of positioning grooves 41, thus the cam indexer 100 reaches a first working state.

When the driver 21 drives the driving plate 30 to rotate in a reverse direction, because the positioning member 63 is out of one of the plurality of positioning grooves 41, the latching assembly 50 is capable of driving the multi-task dial 40 to rotate synchronously. The positioning member 63 resists on the periphery of the multi-task dial 40, when a next one of the plurality of positioning grooves 41 is aligned to the positioning member 63, the positioning member 63 is pushed by the elastic member 65 and engages one of the plurality of positioning grooves 41 finally via the positioning surface 633. Then the multi-task dial 40 stops rotating and the latching member 53 engages into one of the plurality of positioning grooves 41 again, the latching assembly 50 reaches the original position, thus the cam indexer 100 reaches a second working state.

The cam indexer 100 is simple, it merely includes a driving plate 30, a multi-task dial 40, a driver 21, a latching assembly 50 and a positioning assembly 60. Moreover, the installing process of the cam indexer 100 is convenient due to its simple structure. As the driving plate 30 just needs to be rotated within a predetermined angle, so a common rotation cylinder connected to the driving plate 30 is capable of satisfying the working demands of the cam indexer 100, a complicated steering model is not required, nor is a dedicated motor with expensive toolings and accessories, thus a manufacturing cost is decreased.

It should be noted that the positioning surface 633 of the positioning member 63 may be omitted. The number and the layout of the plurality of positioning grooves 41 of the multi-task dial 40 may be changed as needed.

It should be noted that the rotation shaft 33 may be configured on the driving shaft 23, and extended into the driving plate 30 and the multi-task dial 40, the rotation shaft 33 is fixed to the driving plate 30 and rotatably inserted into the multi-task dial 40.

It should be noted that a side surface of each of the plurality of the positioning grooves 41 may be inclined to define an angle together with the radial direction of the multi-task dial 40 to enable the latching member 53 to slide out of the positioning grove 41 smoothly.

While various embodiments have been described and illustrated, the disclosure is not to be construed as being restricted thereto. Various modifications can be made to the embodiments by those skilled in the art without departing from the true spirit and scope of the disclosure as defined by the appended claims.

What is claimed is:

1. A cam indexer, comprising:
a driving assembly;
a driving plate driven by the driving assembly, the driving plate defining an arc-groove on a periphery of the driving plate and a cam surface at a bottom of the arc-groove, the driving plate further comprising a receiving end and a resisting end positioned at opposite ends of the cam surface, a distance between the receiving end and a center of the driving plate being less than a distance between the resisting end and the center of the driving plate;

a multi-task dial defining a plurality of positioning grooves along a periphery of the multi-task dial, an angle subtended at a center of the multi-task dial by every adjacent two of the plurality of positioning grooves being equal to an angle subtended at a center of the driving plate by the receiving end and the resisting end;

a latching assembly fixed to the driving plate and elastically engaging in a first one of the plurality of positioning grooves, a positioning assembly elastically engaging in a second one of the plurality of positioning grooves and resisting on the receiving end of the driving plate, the first one and the second one of the plurality of positioning grooves are separated from each other by at least two of the plurality of positioning grooves, wherein the latching assembly is adapted to detach from the first one of the plurality of positioning grooves when the driving plate rotates toward the positioning assembly along a first direction, such that when the resisting end of the driving plate reaches the positing assembly and resists the positioning assembly to slide out of the second one of the plurality of positioning grooves, the latching assembly synchronously engages into one of the plurality of positioning grooves next to the first one of the plurality of the position grooves; and when the driving assembly drives the driving plate to rotate along a second direction opposite to the first direction, the latching assembly is adapted to drive the multi-task dial to rotate along the second direction until the positioning assembly reaches and engages into one of the plurality of positioning grooves next to the second one of the plurality of positioning grooves.

2. The cam indexer of claim 1, wherein the plurality of positioning grooves are arranged along a side surface of the multi-task dial uniformly, each of the plurality of positioning grooves faces outside of the multi-task dial and extends along a radial direction of the multi-task dial.

3. The cam indexer of claim 1, wherein the latching assembly comprises a latching member forming a latching surface at an end, the latching surface resists on a side surface of one of the plurality of positioning grooves, when the driving plate rotates toward the positioning assembly, the latching surface is configured to break away from one of the plurality of positioning grooves such that the latching assembly is rotated along the periphery of the multi-task dial.

4. The cam indexer of claim 1, wherein the driving plate defines a mounting groove at the periphery thereof, the latching assembly comprises a latching housing, a latching member and a resilient member, the latching housing is received in the mounting groove and defines a receiving groove along a length direction of the latching housing, the resilient member is received within the receiving groove, the latching member is connected to the resilient member and partially received in one of the plurality of positioning grooves of the multi-task dial.

5. The cam indexer of claim 1, wherein the positioning assembly comprises a positioning housing, a positioning member and an elastic member, the positioning housing defines a receiving groove thereof, the elastic member is received in the receiving groove, the positioning member is connected to the elastic member and partially received in one of the plurality of positioning grooves of the multi-task dial.

6. The cam indexer of claim 5, wherein the positioning housing comprises a fixing portion and a guiding portion fixed to the fixing portion, the guiding portion comprises an extending end extending outwardly from an end of the fixing portion, the receiving groove extends through the extending end and cuts through an end surface of the extending end, the guiding portion further defines a through groove on the extending end communicating with the receiving groove, the positioning member comprises a positioning portion perpendicularly extending from a side thereof, the positioning portion extends through the through groove.

7. The cam indexer of claim 6, further comprises a bottom plate, the driving plate is rotatably mounted on the bottom plate, the fixing portion is fixed to the bottom plate, the extending end and the bottom plate cooperatively define a moving space, the through groove communicates with the moving space, the positioning portion is partially received in the moving space and resists on the cam surface of the driving plate.

8. The cam indexer of claim 7, wherein the positioning member further comprises an end portion and defines an inclined positioning surface at the end portion, the end portion extends out of the positioning housing and is elastically latched in one of the plurality of positioning grooves.

9. The cam indexer of claim 1, further comprises a bottom plate defining a mounting hole in a middle of the bottom plate, the driving assembly comprises a driver and a driving shaft connected to an end of the driver, the driver is fixed to the bottom plate, the driving shaft extends through the mounting hole, the driving plate is fixed to the driving shaft.

10. The cam indexer of claim 1, wherein the driving plate comprises a main body and a rotation shaft perpendicularly extending from a center of the main body, the multi-task dial defines a pivotal hole at the center of thereof, the multi-task dial is rotatably sleeved on the rotation shaft of the driving plate via the pivotal hole.

11. A cam indexer, comprising:

a driving assembly;

a driving plate driven by the driving assembly, the driving plate defining a cam surface on a periphery of the driving plate, and comprising a receiving end and a resisting end positioned at the cam surface, a distance between the receiving end and a center of driving plate being less than a distance between the resisting end and the center of the driving plate;

a multi-task dial defining a plurality of positioning grooves along a periphery of the multi-task dial, an angle subtended at a center of the multi-task dial by every adjacent two of the plurality of positioning grooves being equal to an angle subtended at a center of the driving plate by the receiving end and the resisting end;

a latching assembly fixed to the driving plate and elastically engaging in a first one of the plurality of positioning grooves, a positioning assembly comprising a positioning member, the positioning member comprising a positioning portion perpendicularly extending from a side thereof, the positioning member elastically engaging in a second one of the plurality of positioning grooves, the positioning portion being resisting on the cam surface of the driving plate, the first one and the second one of the plurality of positioning grooves are separated from each other by at least two of the plurality of positioning grooves, wherein the latching assembly is adapted to detach from the first one of the plurality of positioning grooves when the driving plate rotating toward the positioning assembly along a first direction, such that when the resisting end of the driving plate reaches the positing assembly and resists the positioning member to slide out of the second one of the plurality of positioning grooves, the latching assembly synchronously engages into one of the plurality of positioning grooves next to the first one of the plurality of positioning grooves; and when the driving assembly drives the driving plate to rotate along a second direction opposite to the first direction, the latching assembly is adapted to drive the multi-task dial to rotate along the second direction until the positioning member reaches and engages into one of the plurality of positioning grooves next to the second one of the plurality of positioning grooves.

12. The cam indexer of claim 11, wherein the plurality of positioning grooves are arranged along a side surface of the multi-task dial uniformly, each of the plurality of positioning grooves faces outside of the multi-task dial and extends along a radial direction of the multi-task dial, the multi-task dial defines an arc-groove at the periphery thereof, the cam surface is located at a bottom of the arc-groove, the receiving end and the resisting end are positioned at opposite ends of the cam surface.

13. The cam indexer of claim 11, wherein the latching assembly defines a latching surface at an end, the latching surface resists on a side surface of one of the plurality of positioning grooves, when the driving plate rotates toward the positioning assembly, the latching surface is configured to break away from one of the plurality of positioning grooves such that the latching assembly is rotated along the periphery of the multi-task dial.

14. The cam indexer of claim 11, wherein the driving plate defines a mounting groove at the periphery thereof, the latching assembly comprises a latching housing, a latching member and a resilient member, the latching housing is received in the mounting groove and defines a receiving groove along a length direction of the latching housing, the resilient member is received within the receiving groove, the latching member is connected to the resilient member and partially received in one of the plurality of positioning grooves of the multi-task dial.

15. The cam indexer of claim 11, wherein the positioning assembly further comprises a positioning housing and an elastic member, the positioning housing defines a receiving groove thereof, the elastic member is received in the receiving groove, the positioning member is connected to the elastic member and partially received in one of the plurality of positioning grooves of the multi-task dial.

16. The cam indexer of claim 15, wherein the positioning housing comprises a fixing portion and a guiding portion fixed to the fixing portion, the guiding portion comprises an extending end extending outwardly from an end of the fixing portion, the receiving groove extends through the extending end and cuts through an end surface of the extending end, the guiding portion further defines a through groove communicating with the receiving groove on the extending end, the positioning portion extends through the through groove.

17. The cam indexer of claim 16, further comprises a bottom plate, the driving plate is rotatably mounted on the bottom plate, the fixing portion is fixed to the bottom plate, the extending end and the bottom plate defines a moving space cooperatively, the through groove communicates with the moving space, the positioning portion is partially received in the moving space and resists on the cam surface of the driving plate.

18. The cam indexer of claim 17, wherein the positioning member further comprises an end portion and defines an inclined positioning surface at the end portion, the end portion extends out of the positioning housing and is elastically latched in one of the plurality of positioning grooves.

19. The cam indexer of claim 11, further comprises a bottom plate defining a mounting hole in a middle of the bottom plate, the driving assembly comprises a driver and a driving shaft connected to an end of the driver, the driver is fixed to the bottom plate, the driving shaft extends through the mounting hole, the driving plate is fixed to the driving shaft.

20. The cam indexer of claim 11, wherein the driving plate comprises a main body and a rotation shaft perpendicularly extending from a center of the main body, the multi-task dial defines a pivotal hole at the center of thereof, the multi-task dial is rotatably sleeved on the rotation shaft of the driving plate via the pivotal hole.

\* \* \* \* \*